United States Patent
Kurihara et al.

(10) Patent No.: US 10,906,176 B2
(45) Date of Patent: Feb. 2, 2021

(54) TEACHING APPARATUS FOR PERFORMING TEACHING OPERATION FOR ROBOT

(71) Applicant: FANUC CORPORATION, Yamanashi (JP)

(72) Inventors: Yuusuke Kurihara, Yamanashi (JP); Tomoyuki Yamamoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 273 days.

(21) Appl. No.: 16/181,842

(22) Filed: Nov. 6, 2018

(65) Prior Publication Data

US 2019/0160663 A1 May 30, 2019

(30) Foreign Application Priority Data

Nov. 24, 2017 (JP) ................................. 2017-226095

(51) Int. Cl.
*G05B 15/00* (2006.01)
*B25J 9/16* (2006.01)

(52) U.S. Cl.
CPC ..... *B25J 9/163* (2013.01); *G05B 2219/36433* (2013.01); *G05B 2219/36442* (2013.01)

(58) Field of Classification Search
CPC .............. B25J 9/163; G05B 19/425; G05B 2219/36433; G05B 2219/36442; G05B 2219/40431
See application file for complete search history.

(56) References Cited

U.S. PATENT DOCUMENTS

| 4,831,548 A * | 5/1989 | Matoba | G05B 19/425 382/153 |
| 8,621,719 B2 | 1/2014 | Nakashima et al. | |
| 2006/0229766 A1* | 10/2006 | Setsuda | G05B 19/425 700/245 |
| 2008/0005418 A1* | 1/2008 | Julian | H04Q 9/00 710/62 |

(Continued)

FOREIGN PATENT DOCUMENTS

| EP | 0597127 A1 | 5/1994 |
| JP | 05324039 A | 12/1993 |

(Continued)

*Primary Examiner* — Harry Y Oh
(74) *Attorney, Agent, or Firm* — RatnerPrestia

(57) ABSTRACT

A teaching apparatus configured to include a display device and perform a teaching operation for a robot includes a template storage section configured to store a plurality of templates corresponding to a plurality of programs of the robot, a program explanatory content storage section configured to store plural pieces of explanatory content for explaining the respective plurality of programs, a template display section configured to display the plurality of templates stored in the template storage section on the display device, a template selection section configured to select one template from the plurality of templates displayed on the template display section, and a program explanatory content display section configured to read out the explanatory content of the program corresponding to the one template selected by the template selection section from the program explanatory content storage section and configured to display the explanatory content on the display device.

4 Claims, 7 Drawing Sheets

(56) References Cited

U.S. PATENT DOCUMENTS

2009/0289591 A1* 11/2009 Kassow ................... B25J 18/00
  318/568.13
2016/0059412 A1* 3/2016 Oleynik ................... B25J 19/02
  700/257
2017/0320211 A1* 11/2017 Akan ..................... B25J 9/1671

FOREIGN PATENT DOCUMENTS

| JP | 11216693 A | 8/1999 |
| JP | 2009297887 A | 12/2009 |
| JP | 2012058794 A | 3/2012 |
| JP | 2013-012051 A | 1/2013 |
| JP | 2014192356 A | 10/2014 |

* cited by examiner

FIG. 2B

```
1: -- TEMPLATE FOR PICK AND PLACE
2: -- THIS IS TEMPLATE OF PROGRAM FOR MOVING WORKPIECE FROM CERTAIN POSITION TO ANOTHER POSITION
3:
4: -- INITIAL SETTING OF COORDINATE SYSTEM
5:    TOOL COORDINATE NUMBER = 1
6:
7: -- SETTING OF LOAD (NO PARTS)
8:    LOAD SETTING [1]
9:
10: -- OPEN GRIPPER
11:    CALLING GRIPPER_OPEN
12:
13: -- MOVE TO WORKPIECE PICKUP STANDBY POSITION
14: -- TODO:
    :   PLEASE CORRECT AND TEACH POSITION SLIGHTLY AWAY FROM WORKPIECE PICKUP POSITION AT THIS POSITION
15: EACH AXIS POSITION [1: PICK STANDBY] 5% POSITIONING
16:
17: -- MOVE TO WORKPIECE PICKUP POSITION
18: -- TODO: PLEASE CORRECT AND TEACH WORKPIECE PICKUP POSITION AT THIS POSITION
19: STRAIGHT LINE POSITION [2: PICK POINT] 200 mm/sec POSITIONING
20:
21: -- CLOSE GRIPPER, AND HOLD WORKPIECE
22:    CALLING GRIPPER_CLOSE
23:
24: -- SETTING OF LOAD (PARTS EXIST)
25:    LOAD SETTING [2]
26:
27: -- TRANSIT POINT
28: -- TODO:
    :   PLEASE CORRECT AND TEACH THIS TRANSIT POINT. PLEASE ADD TRANSIT POINT AS REQUIRED.
29: STRAIGHT LINE POSITION [3: WAY POINT] 200 mm/sec SMOOTH 20
30: // STRAIGHT LINE POSITION [6: WAY POINT] 200 mm/sec SMOOTH 20
31: // STRAIGHT LINE POSITION [7: WAY POINT] 200 mm/sec SMOOTH 20
32: // STRAIGHT LINE POSITION [8: WAY POINT] 200 mm/sec SMOOTH 20
33: // STRAIGHT LINE POSITION [9: WAY POINT] 200 mm/sec SMOOTH 20
34:
35: -- MOVE TO WORKPIECE CONVEYANCE POSITION
36: -- TODO: PLEASE CORRECT AND TEACH WORKPIECE CONVEYANCE POSITION AT THIS POSITION
37: STRAIGHT LINE POSITION [4: PLACE POINT] 200 mm/sec POSITIONING
38:
39: -- OPEN GRIPPER, AND PLACE WORKPIECE
40:    CALLING GRIPPER_OPEN
41:
42: -- MOVE TO WORKPIECE CONVEYANCE POSITION STANDBY
43: -- TODO:
    :   PLEASE CORRECT AND TEACH POSITION SLIGHTLY AWAY FROM WORKPIECE CONVEYANCE POSITION AT THIS POSITION
44: STRAIGHT LINE POSITION [5: PLACE STANDBY] 200 mm/sec POSITIONING
45:
46: -- START PROCESSING
47: -- TRANSMIT SIGNAL TO PERIPHERAL DEVICE AS REQUIRED
48: -- TODO: PLEASE CORRECT NUMBER OF IO SIGNAL IN ACCORDANCE WITH SYSTEM
49: //DO[...] = PULSE
50:
51: -- STANDBY OF COMPLETION OF PROCESSING
52: --STANDBY OF COMPLETION SIGNAL FROM PERIPHERAL DEVICE
53: -- TODO: PLEASE CORRECT NUMBER OF IO SIGNAL IN ACCORDANCE WITH SYSTEM
54: // STANDBY DI[...] = ON
55:
56: -- COMPLETION OF PROCESSING
57: -- TODO: ADD OPERATION AFTER COMPLETION OF PROCESSING THIS POINT FORWARD
58: //STRAIGHT LINE POSITION [10: WAY POINT] 200 mm/sec SMOOTH 20
59: //STRAIGHT LINE POSITION [11: WAY POINT] 200 mm/sec SMOOTH 20
60: //STRAIGHT LINE POSITION [12: WAY POINT] 200 mm/sec SMOOTH 20
61: //STRAIGHT LINE POSITION [13: BACK TO HOME] 200 mm/sec POSITIONING
[END]
```

FIG. 3C

SET STANDBY POSITION

MOVE ROBOT TO POSITION IMMEDIATELY ABOVE THE WORKPIECE TO BE HELD BY PERFORMING JOG OPERATION FOR THE ROBOT.
PLEASE PRACTICE OPERATING THE ROBOT ON NEXT SCREEN ONWARD.

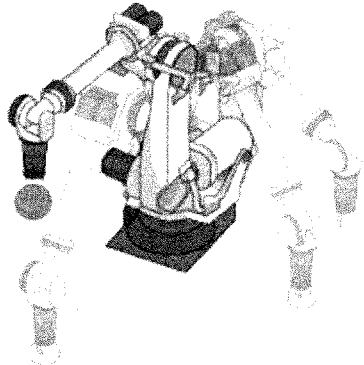

FIG. 3D

MOVE TO STANDBY POSITION

BY PRESSING - X (J1) TO + Z (J6) ARE PRESSED WHILE PRESSING SHIFT WITH DEAD MAN SWITCH HELD, THE ROBOT MOVES.
PLEASE MOVE TO POSITION IMMEDIATELY ABOVE THE WORKPIECE TO BE HELD.

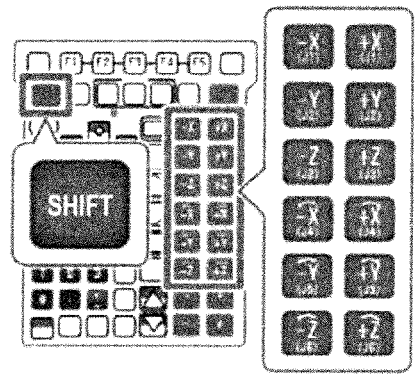
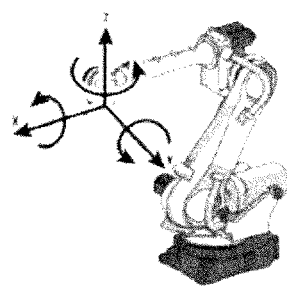

TEACHING APPARATUS FOR PERFORMING TEACHING OPERATION FOR ROBOT

CROSS-REFERENCE TO RELATED APPLICATION

This application is a new U.S. Patent Application that claims benefit of Japanese Patent Application No. 2017-226095, filed Nov. 24, 2017 for all purposes.

BACKGROUND OF THE INVENTION

1. Field of the Invention

The disclosure relates to a teaching apparatus for performing a teaching operation for a robot.

2. Description of the Related Art

When a program for a robot is created by performing a teaching operation for the robot, an operator makes various settings such as the operation speed of the robot and the like while operating a dead man switch. In addition, in many cases, the robot is actually moved in the teaching operation. Thus, when the operator erroneously causes the robot to transfer, there is a possibility that the operator is in danger, or that the peripheral devices of the robot are damaged. Since the aforementioned problems need to be avoided, the teaching operation is hard and complicated for a beginner to perform.

Incidentally, there has been known a technology in which a template corresponding to each of a plurality of operation classifications is stored in a machine control program creation apparatus for creating a machine control program to operate a machine, and a desired template is selected. For example, see JP 2013-012051 A.

SUMMARY OF THE INVENTION

Further, it is necessary to carry out various procedures to safely perform the teaching operation. However, it is quite difficult for a beginner to actually perform the teaching operation after the beginner has understood these procedures. Then, it cannot be said that only selecting a mere desired template from a plurality of templates for the machine control program, in particular, carries out a beginner-friendly function, and thus it is desirable that the content of an operation required for teaching is presented to the beginner.

Therefore, a teaching apparatus capable of steadily creating a program for a robot in response to a teaching operation performed by a beginner has been demanded.

According to a first aspect of the present disclosure, there is provided a teaching apparatus configured to include a display device and perform a teaching operation for a robot, and the teaching apparatus includes a template storage section configured to store a plurality of templates corresponding to a plurality of programs of the robot, a program explanatory content storage section configured to store plural pieces of explanatory content for explaining the respective plurality of programs, a template display section configured to display the plurality of templates stored in the template storage section on the display device, a template selection section configured to select one template from the plurality of templates displayed on the template display section, and a program explanatory content display section configured to read out explanatory content of the program corresponding to the one template selected by the template selection section from the program explanatory content storage section and configured to display the explanatory content on the display device.

According to the first aspect, the explanatory content of a program corresponding to the selected template is displayed on the display device. A beginner can easily perform the teaching operation for the robot in conformity with this guide function and easily create a program for the robot.

The objects, features and advantages of the invention will become more apparent from the following description of the embodiments in connection with the accompanying drawings, wherein:

BRIEF DESCRIPTION OF THE DRAWINGS

FIG. 2B is a diagram illustrating the content of a program corresponding to one template;

FIG. 3C is a diagram illustrating a third example of a screen;

FIG. 3D is a diagram illustrating a fourth example of a screen;

DETAILED DESCRIPTION

Figure 1:
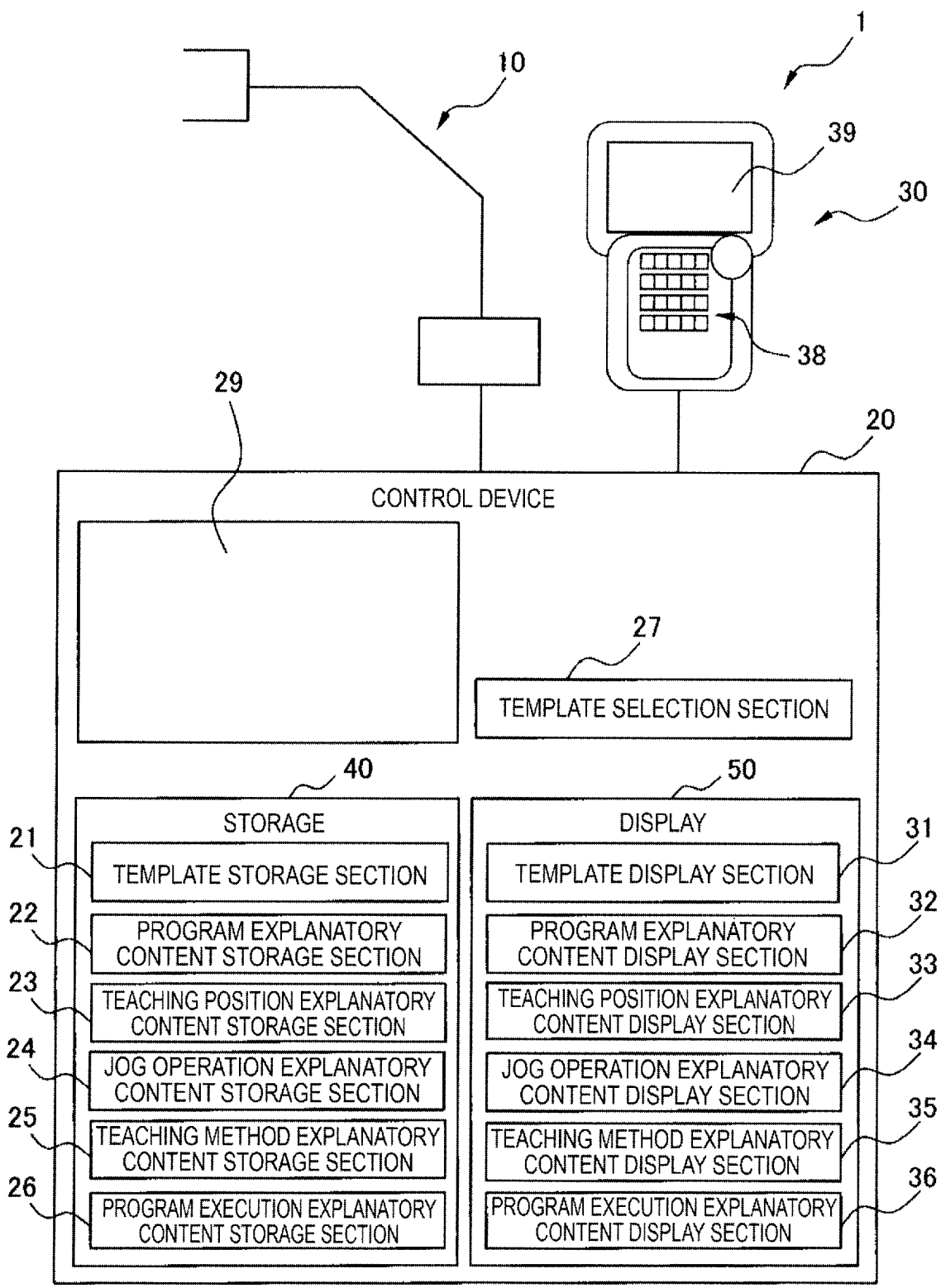
FIG. 1 is a schematic diagram of a teaching system according to a first embodiment.

Embodiments of the present invention will be described below with reference to the accompanying drawings. Throughout the drawings, corresponding components are denoted by common reference numerals.

FIG. 1 is a schematic diagram of a teaching system based on a first embodiment. A teaching system 1 of the first embodiment mainly includes a robot 10, a control device 20 for controlling the robot 10, and a teach pendant 30 connected to the control device 20. In the first embodiment, the control device 20 and the teach pendant 30 function as a teaching apparatus. The robot 10 is an articulated robot and includes a plurality of axes, e.g., six axes. The robot 10 may be a robot that shares working space with a human being and performs collaborative working.

The teach pendant 30 is used for the teaching operation of the robot 10, and the like and carries out the jog feed of each axis of the robot 10 and the like in response to the operation by the operator. The teach pendant 30 includes a plurality of keys 38 used in the operation of the jog feed and the like, and a screen 39 as a display device.

The control device 20 is a digital computer that includes a CPU, a memory, and the like connected to each other with a bus and that includes a screen 29 as a display device. The control device 20 mainly includes a storage 40 for storing various pieces of information and a display 50 for displaying later-described explanatory content read out from the storage 40 on the screen 29 and/or the screen 39.

Specifically, the storage 40 includes a template storage section 21 for storing a plurality of templates corresponding to a plurality of programs of the robot 10, a program explanatory content storage section 22 for storing plural pieces of explanatory content for explaining each of the plurality of programs, a teaching position explanatory content storage section 23 for storing explanatory content for explaining a teaching position in a program, a jog operation explanatory content storage section 24 for storing explanatory content for explaining a jog operation of the robot 10, a teaching method explanatory content storage section 25 for storing explanatory content for explaining a teaching method by which the robot 10 is moved to a teaching position and taught, and a program execution explanatory content storage section 26 for storing explanatory content for explaining the execution of a created program.

Further, the display 50 includes a template display section 31 for displaying the plurality of templates stored in the template storage section 21 on the display devices 29 and 39, a program explanatory content display section 32 for reading out the explanatory content of a program corresponding to one template selected by the template selection section 27 from the program explanatory content storage section 22 and displaying the explanatory content on the display devices 29 and 39, a teaching position explanatory content display section 33 for displaying explanatory content stored in the teaching position explanatory content storage section 23 on the display devices 29 and 39, a jog operation explanatory content display section 34 for displaying explanatory content stored in the jog operation explanatory content storage section 24 on the display devices 29 and 39, a teaching method explanatory content display section 35 for displaying explanatory content stored in the teaching method explanatory content storage section 25 on the display devices 29 and 39, and a program execution explanatory content display section 36 for displaying explanatory content stored in the program execution explanatory content storage section 26 on the display devices 29 and 39. Further, the display device 20 includes the template selection section 27 for selecting one template from the plurality of templates displayed by the template display section 31.

Figure 2A:
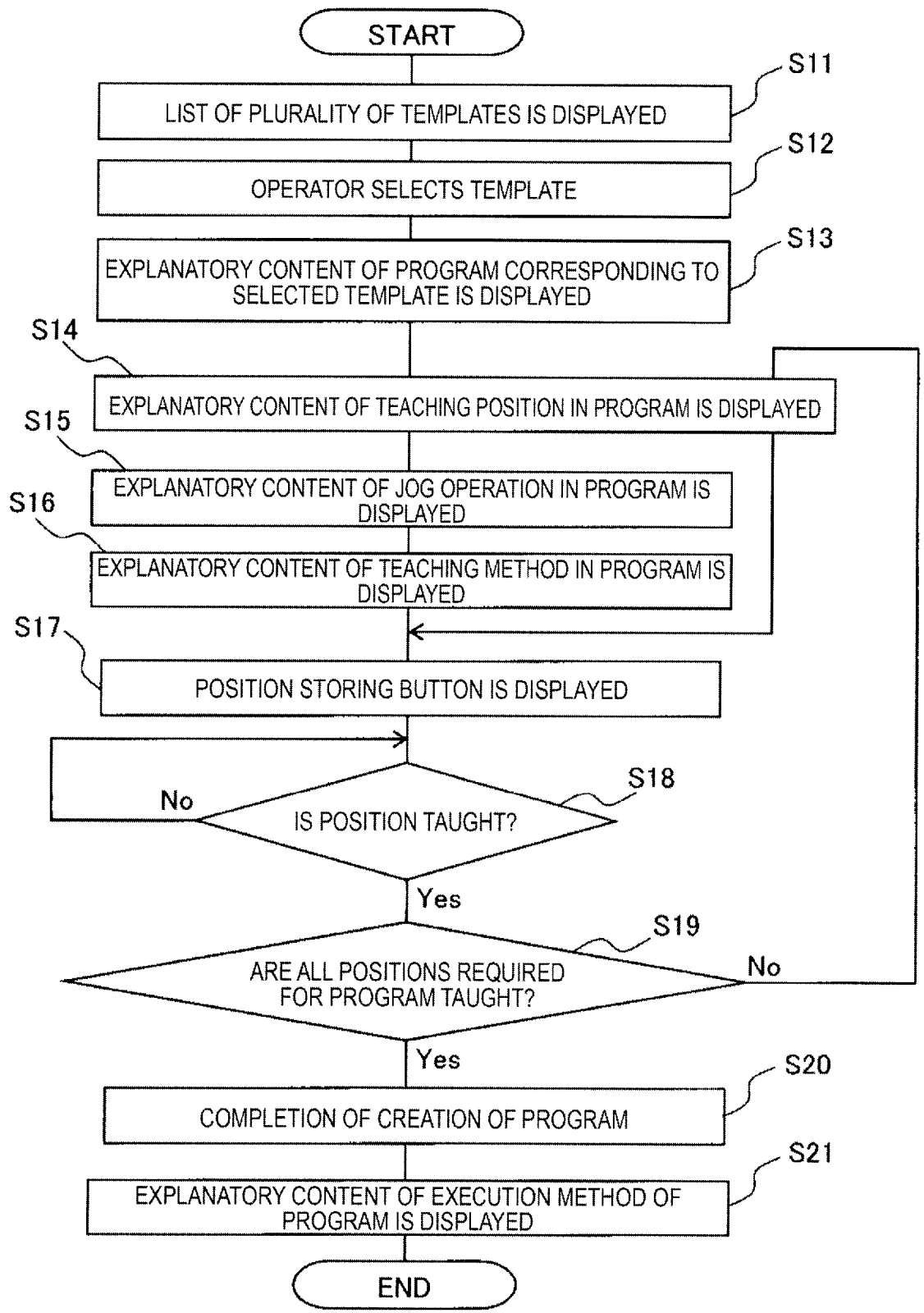
FIG. 2A is a flowchart illustrating an operation of the teaching system.

FIG. 2A is a flowchart illustrating an operation of the teaching system illustrated in FIG. 1. First, an operator presses a predetermined key 38 on the teach pendant 30 and activates a guide function for the teaching operation of the robot 10. This causes the template display section 31 to display a list of names of the plurality of templates stored in the template storage section 21 on the screen 39 of the teach pendant 30. Note that the content of the guide function may be displayed on the screen 29 of the control device 20. Hereinafter, it is assumed that the content of the guide function is displayed on the screen 39 of the teach pendant 30.

Figure 3A:
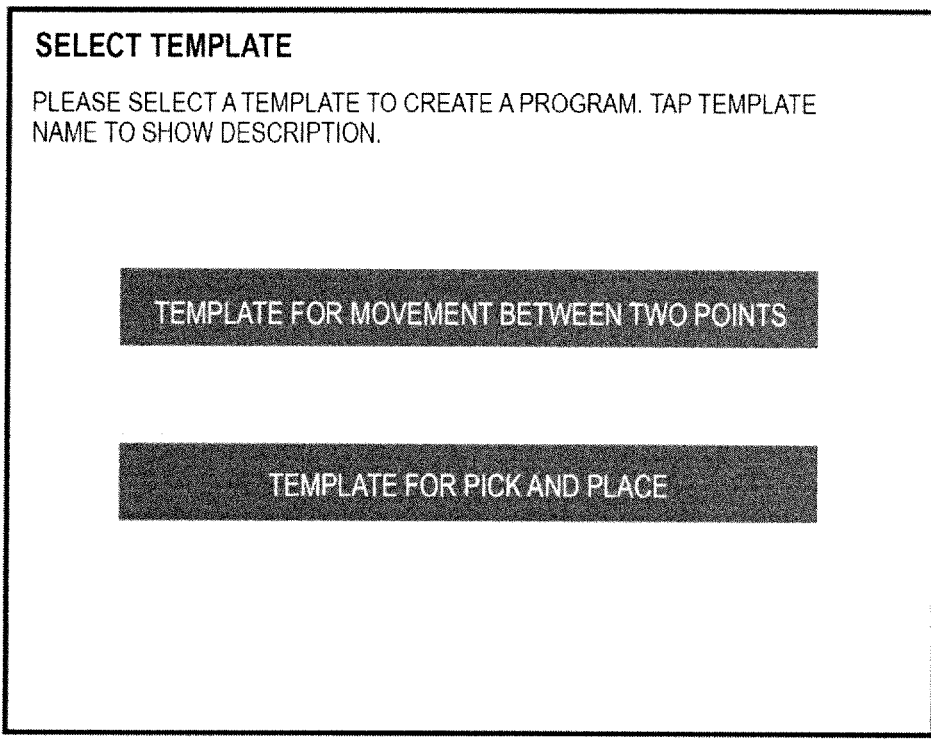
FIG. 3A is a diagram illustrating a first example of a screen.

FIG. 3A is a diagram illustrating a first example of a screen. In FIG. 3A, for example, a list of names of "template for movement between two points" and "template for pick and place" is indicated. The "template for movement between two points" is a template of a program used in the case that the robot 10 is moved from a certain position to another position. The "template for pick and place" is a template of a program used in the case that the robot 10 picks up a workpiece (not illustrated) at a certain position, subsequently moves to another position, and releases the workpiece.

In other words, a corresponding program for movement between two points is associated with the "template for movement between two points" in advance. Similarly, a corresponding program for pick and place is associated with the "template for pick and place" in advance.

As a matter of course, another template may be displayed. In addition, as illustrated in FIG. 3A, "Please select a template to create a program. Tap template name to show description." and the like may be displayed along with the list of templates. In addition to an explanatory sentence, the explanatory content may include at least one of an image, a moving image, and voice. This facilitates the understanding of the operator.

Then, at Step S12, the operator selects a desired template from the plurality of templates by using the template selection section 27. The template selection section 27 may be provided as the keys 38 of the teach pendant 30 or a touch panel incorporated in the screen 39 and the like. Hereinafter, the explanation will be made, assuming that the operator has selected the "template for pick and place".

Herein, in FIG. 2B, the content of the "template for pick and place" is shown. The content of this template may be displayed on the screen 39. The "template for pick and place" is a template of a program for pick and place.

In the template shown in FIG. 2B, "position 1" described on the 15th line is a standby position of the robot 10, and "position 2" described on the 19th line is a workpiece pickup position at which the robot 10 picks up a workpiece, and "position 3" described on the 29th line is a transit position (transit point) of the robot 10 that holds the workpiece, and "position 4" described on the 37th line is a workpiece conveyance position at which the robot 10 releases the workpiece, and "position 5" described on the 44th line is a workpiece conveyance standby position of the robot 10 after the release of the workpiece.

The standby position, the workpiece pickup position, the transit position, the workpiece conveyance position, and the workpiece conveyance standby position are teaching positions to be taught in the program for pick and place. Then, at a stage of Step S12, any of these teaching positions are not taught. At the following Steps, the operator actually teaches these teaching positions, thereby completing the program for pick and place. Note that the number of teaching positions in the "template for pick and place" is five at minimum. The number of teaching positions in the "template for movement between two points" may be set to another value. In other words, the number of teaching positions required to complete the program is determined in accordance with a selected template.

Figure 3B:
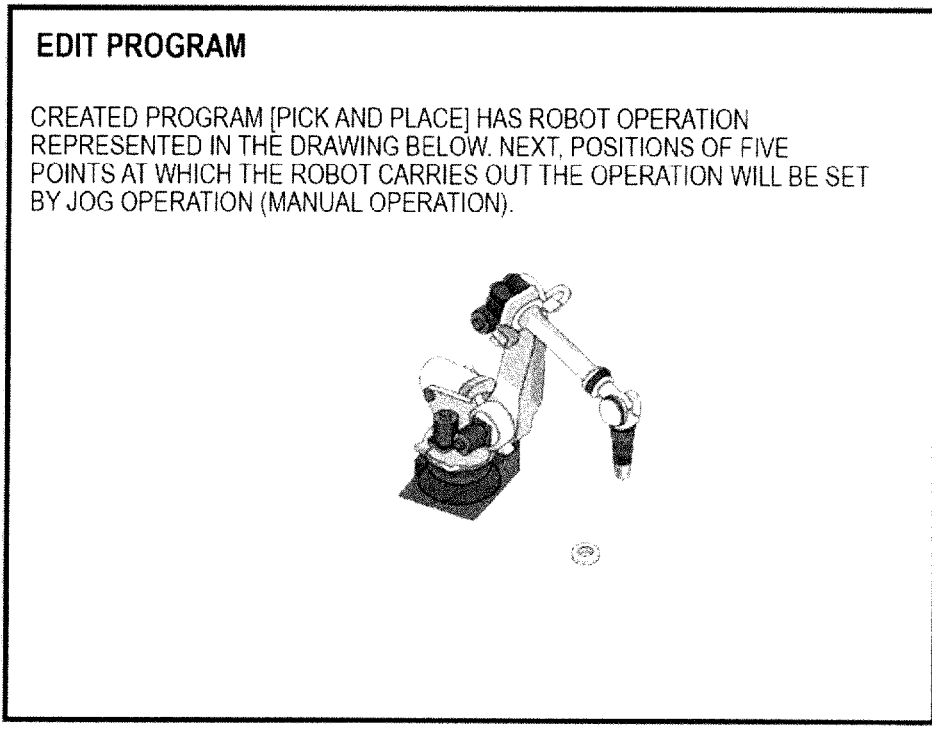
FIG. 3B is a diagram illustrating a second example of a screen.

Subsequently, at Step S13, the explanatory content of the program corresponding to the selected template is read out from the program explanatory content storage section 22. Then, the explanatory content is displayed by the program explanatory content display section 32 on the screen 39. Herein, FIG. 3B is a diagram illustrating a second example of a screen. In FIG. 3B, a moving image or animation in which the robot picks up a workpiece, along with the explanatory content of the program "the created program for 'pick and place' is a robot operation represented in the drawing below", is displayed on the screen 39. Further, in FIG. 3B, the explanatory sentence for the next step "Next, the positions of five points at which the robot carries out an operation will be set by a jog operation (manual operation)" is also displayed. Since the guide function described above is displayed, a beginner can easily perform the teaching operation for a robot and easily create a program for the robot.

When a predetermined time elapses after the display of the explanatory content, it is determined that the operator has understood the explanatory content, in this case, the explanatory content of the program for pick and place, and the processing proceeds to the next step. Alternatively, when the operator presses a predetermined key 38 after the display of the explanatory content, the processing may proceed to the next step. The same is applied to the following steps.

At Step S14, the explanatory content of the teaching position is read out from the teaching position explanatory content storage section 23, and the explanatory content is displayed by the teaching position explanatory content display section 33 on the screen 39. Herein, FIG. 3C is a diagram illustrating a third example of a screen. In FIG. 3C, the explanatory content for the setting of the standby position is illustrated as an initial teaching position in the program for pick and place. The standby position is, e.g., a position immediately above the workpiece to be held. Note that when the next teaching position, e.g., the workpiece pickup position is explained, the content displayed on the screen 39 is different from that in the case of FIG. 3C. This allows the operator to learn the teaching positions.

As described above, when it is determined that the operator has understood the standby position, the processing proceeds to Step S15. At Step S15, the explanatory content of the jog operation is read out from the jog operation explanatory content storage section 24, and the explanatory content is displayed by the jog operation explanatory content display section 34 on the screen 39. Herein, FIG. 3D is a diagram illustrating a fourth example of a screen. The explanatory content in FIG. 3D includes the images of the robot 10 and the plurality of keys 38 of the teach pendant 30, in addition to the explanatory sentence "By pressing −X (J1) to +Z (J6) while pressing shift with the dead man switch held, the robot moves.". In FIG. 3D, the keys 38 of the teach pendant 30, which is used in the jog operation, e.g., a shift key and another key are partially enlarged and displayed so as to facilitate the understanding of the operator. Note that the dead man switch is normally provided on the back of the teach pendant 30. This allows the operator to learn the jog operation.

Figure 3E:
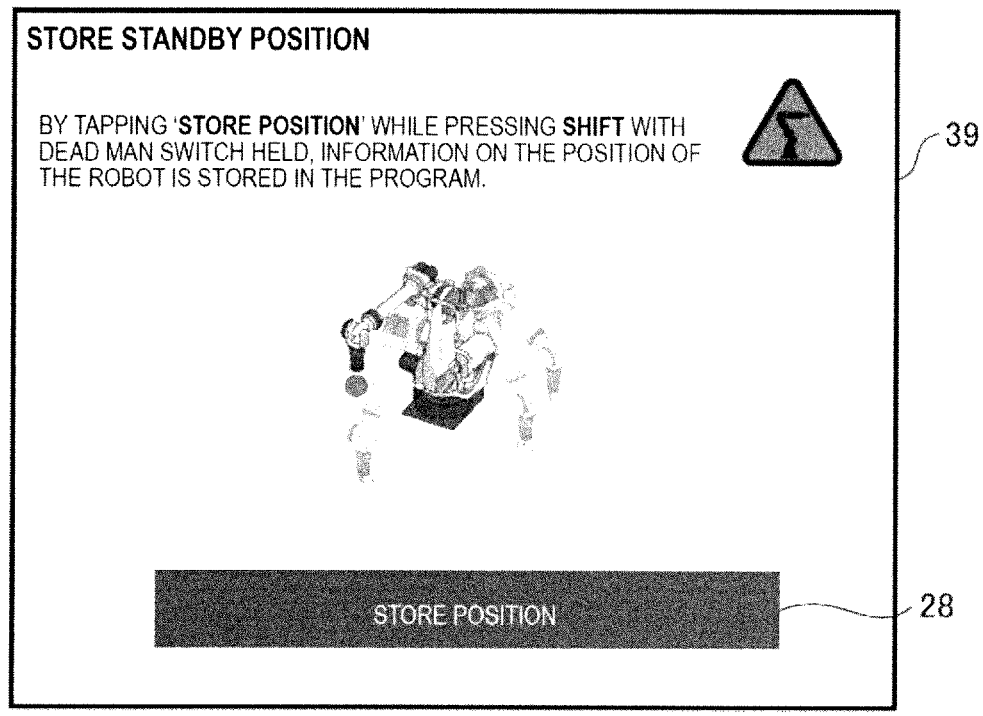
FIG. 3E is a diagram illustrating a fifth example of a screen.

When it is determined that the operator has understood the jog operation, the processing proceeds to Step S16. At Step S16, the explanatory content of the teaching method is read out from the teaching method explanatory content storage section 25, and the explanatory content is displayed by the teaching method explanatory content display section 35 on the screen 39. Herein, FIG. 3E is a diagram illustrating a fifth example of a screen. The explanatory content in FIG. 3E includes the image of the robot 10, in addition to the explanatory sentence "By tapping 'store position' while pressing shift with the dead man switch held, information on the position of the robot is stored in the program". This allows the operator to learn the teaching method.

When it is determined that the operator has understood the teaching method, as illustrated in FIG. 3E, a position storing button 28 is displayed on the screen 39 (Step S17). Note that the position storing button 28 may be simultaneously displayed with the explanatory content of the teaching method on the screen 39.

When the operator actually moves the robot 10 to a desired position, e.g., the standby position by the jog operation, the operator taps or presses the position storing button 28 in accordance with the explanatory content described above. This completes the teaching of a first teaching position (standby position) in the program (Step S18).

Subsequently, the processing proceeds to Step S19, and it is determined whether all the positions required for the program are taught. As described above, the number of teaching positions is predetermined in accordance with the program corresponding to a selected template. For example, in the case of the program for pick and place, the number of teaching positions is five.

When it is determined that all the teaching positions are not taught, the processing returns to Step S14. In this case, the explanatory content of the next teaching position in the program for pick and place, e.g., the workpiece pickup position existing immediately below the standby position to pick up the workpiece is displayed on the screen 39.

In this case, the operator has already learned the jog operation and the teaching method. Thus, the aforementioned Steps S15 and S16 are omitted, and at Step S17, the position storing button 28 is displayed as described above. However, the aforementioned Steps S15 and S16 may be executed again in conformity with the request of the operator.

Then, the operator moves the robot 10 to the workpiece pickup position by the jog operation, and the operator similarly taps or presses the position storing button 28. This completes the teaching of a second teaching position (workpiece pickup position). Subsequently, the transit position (transit point), the workpiece conveyance position, and the workpiece conveyance standby position are similarly taught.

This processing is repeated, and when it is determined that all the teaching positions are taught at Step S19, the program for pick and place is completed (Step S20).

Note that, in FIG. 2B, "position 6" to "position 9" described in the 30th to 33th lines and "position 10" to "position 13" described in the 58th to 61th lines are teaching positions that the operator can add. When the operator makes a request, some of "position 6" to "position 13" may be added as the teaching position. In this case, the processing of Step S18 to Step S19 in FIG. 2A changes in accordance with the number of added teaching positions.

Figure 3F:
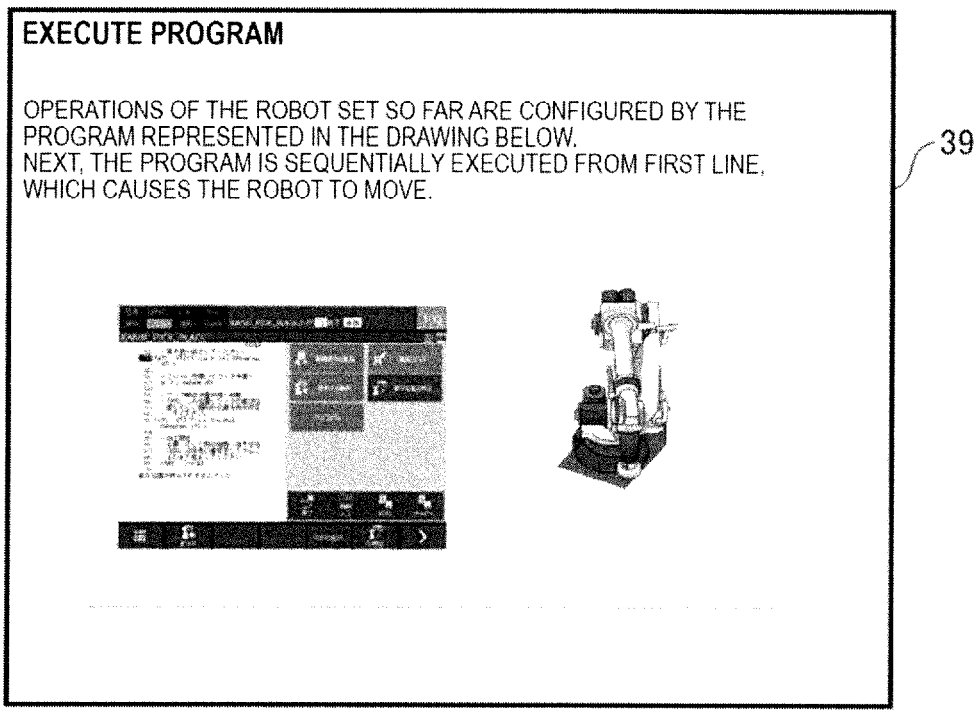
FIG. 3F is a diagram illustrating a sixth example of a screen.

Subsequently, at Step S21, the explanatory content for the execution of the completed program is read out from the program execution explanatory content storage section 26, and the explanatory content is displayed by the program execution explanatory content display section 36 on the screen 39. FIG. 3F is a diagram illustrating a sixth example of a screen. The explanatory content in FIG. 3F includes the explanatory sentence "Operations of the robot set so far are configured by the program represented in the drawing below. Next, the program is sequentially executed from the first line, which causes the robot to move.", the content of the created program, and the image of the robot. This allows the operator to learn the execution of the program.

Then, the created program is actually executed line by line. The operator can verify the actual operation of the robot 10 while referring to the content of the line to be executed. In other words, when the robot 10 is actually operated on the basis of the program, it can be verified whether the robot 10 collides with human beings, peripheral devices, and the like in advance. Then, the program is executed line by line, so that when it is determined that the robot 10 collides with a human being and the like, a teaching position prior to collision can be easily grasped. Thus, the operator changes the teaching position prior to the collision according to re-teaching, thereby avoiding the collision. Consequently, the human being can steadily be avoided from being put in danger. If the last line of the program is executed, and there is no collision by the robot 10 and the like, it can be determined that the created program has no problem.

Thus, in the present disclosure, the control device 20 and the teach pendant 30 as the teaching apparatus include the guide function for the operator when the program of the robot 10 is created. Then, the operator can perform the teaching operation by using the teach pendant 30 in conformity with the guide function displayed on the display device 29. Thus, even when the operator is a beginner, the operator can easily create the program of the robot 10 with the minimum teaching operation.

In the first embodiment, the operator performs the teaching operation while actually moving the robot 10 in conformity with the guide function, which prevents the operator from erroneously moving the robot 10. Consequently, the operator can safely perform the teaching operation. Further, the execution method of the completed program is also displayed on the display device 29, so that the operator can perform the creation to the execution of the program with the teaching apparatus of the present disclosure.

In addition, in the respective Steps S13 to S16 described above, the template may be displayed on the screen before the corresponding explanatory content is displayed, or at the same time when the explanatory content is displayed. In this case, it is preferable that a line corresponding to the template be emphasized and displayed, and thus the operator can grasp the progress of the teaching operation.

Moreover, the teaching apparatus may include a guide function by which the operator can learn a method for using typical commands used in programming or the associated operation of the robot 10 while actually moving the robot 10.

Figure 4:
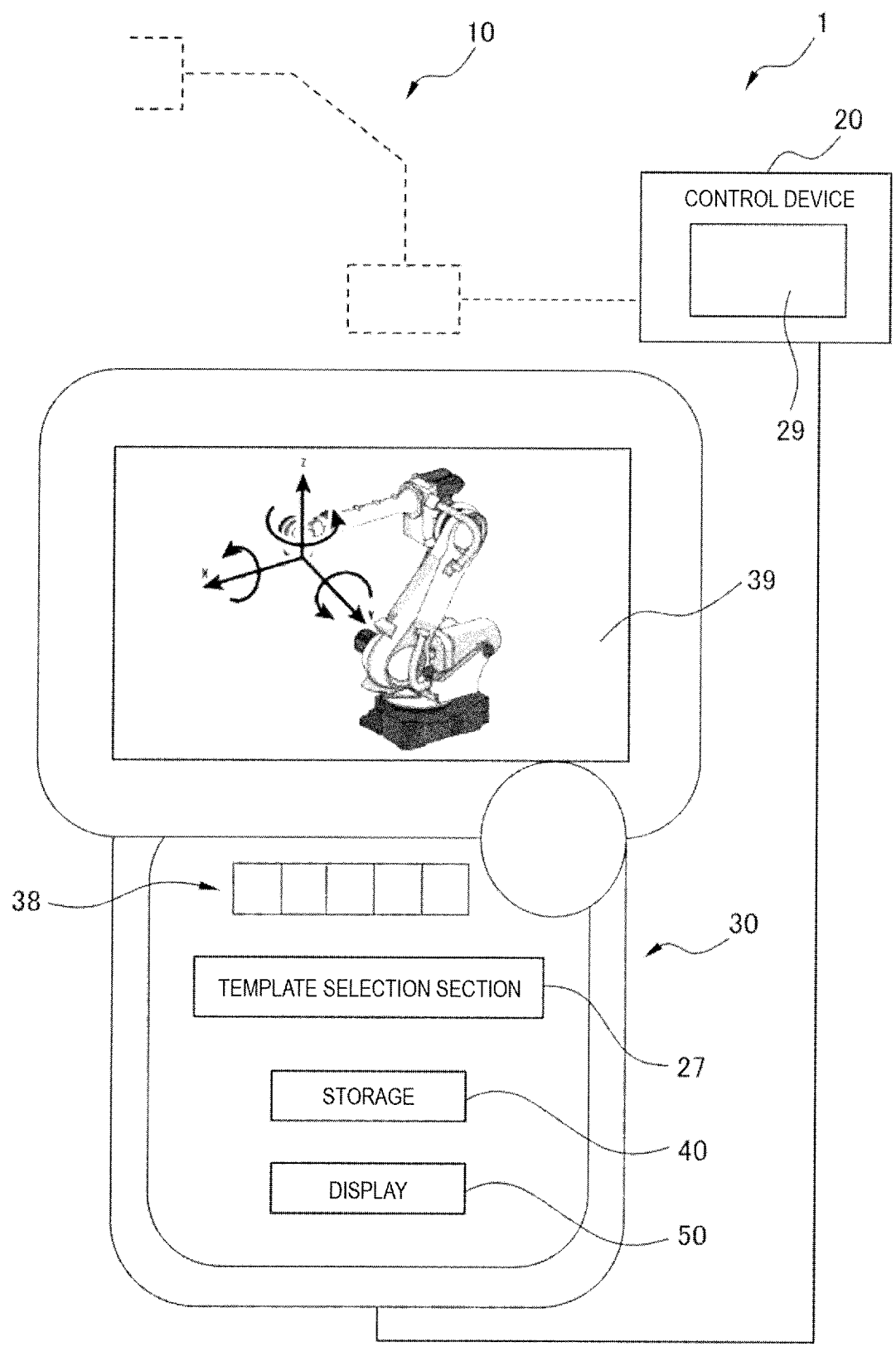
FIG. 4 is a schematic diagram illustrating a teaching system based on a second embodiment.

Further, FIG. 4 is a schematic diagram illustrating a teaching system based on a second embodiment. The teaching system 1 illustrated in FIG. 4 mainly includes the control device 20 for controlling the robot 10 and the teach pendant 30 connected to the control device 20. In FIG. 4, the teach pendant 30 includes the template selection section 27, the storage 40, and the display 50. Note that, as is the same with the first embodiment, the storage 40 includes the template storage section 21 to the program execution explanatory content storage section 26 described above, and the display 50 includes the template display section 31 to the program execution explanatory content display section 36 described above. In this case, the teach pendant 30 independently functions as the teaching apparatus.

Further, in FIG. 4, the model of the robot 10 is displayed on the screen 39 of the teach pendant 30. Then, the robot 10 to be connected to the control device 20 is illustrated in a dashed line. In the second embodiment, the model of the robot 10 is displayed on the screen 39 in a state in which there is no robot 10. In the aforementioned teaching operation, the model of the robot 10 changes its orientation on the screen 39 in accordance with the jog feed. Further, the model of a human being and/or the model of a peripheral device can be displayed on the screen 39 along with the model of the robot 10. Thus, the operator can similarly verify whether the model of the robot 10 collides with the model of a human being or the like. Consequently, in the second embodiment, similarly, it will be understood that the operator can easily perform the teaching operation by using the aforementioned guide function of the teach pendant 30. Note that the CPU of the control device 20 and the CPU of the teach pendant 30 serve as the display 50, and the memory of the control device 20 and memory of the teach pendant 30 serve as the storage 40.

ASPECTS OF THE DISCLOSURE

According to the first aspect, there is provided a teaching apparatus (20, 30) configured to include a display device (29, 39) and perform a teaching operation for a robot (10), and the teaching apparatus includes a template storage section (21) configured to store a plurality of templates corresponding to a plurality of programs of the robot, a program explanatory content storage section (22) configured to store plural pieces of explanatory content for explaining the respective plurality of programs, a template display section (31) configured to display the plurality of templates stored in the template storage section on the display device, a template selection section (27) configured to select one template from the plurality of templates displayed on the template display section, and a program explanatory content display section (32) configured to read out explanatory content of the program corresponding to the one template selected by the template selection section from the program explanatory content storage section and configured to display the explanatory content on the display device.

According to the second aspect, in the first aspect, a teaching position explanatory content storage (23) configured to store explanatory content for explaining a teaching position in the program and a teaching position explanatory content display section (33) configured to display the explanatory content stored in the teaching position explanatory content storage section on the display device are further included.

According to the third aspect, in the first and second aspects, a jog operation explanatory content storage section (24) configured to store explanatory content for explaining a jog operation of the robot and a jog operation explanatory content display section (34) configured to display the explanatory content stored in the jog operation explanatory content storage section on the display device are further included.

According to the fourth aspect, in any of the first to third aspects, a teaching method explanatory content storage section (25) configured to store explanatory content for explaining a teaching method for teaching by causing the robot to move to the teaching position and a teaching method explanatory content display section (35) configured to display the explanatory content stored in the teaching method explanatory content storage section on the display device are further included.

According to the fifth aspect, in any of the first to fourth aspects, a program execution explanatory content storage section (26) configured to store explanatory content for explaining execution of a created program and a program execution explanatory content display section (36) configured to display the explanatory content stored in the program execution explanatory content storage section on the display device.

According to the sixth aspect, in any of the first to fifth aspects, the explanatory content includes at least one of an explanatory sentence, an image, a moving image, and voice.

EFFECTS OF ASPECTS

According to the first aspect, the explanatory content of a program corresponding to the selected template is displayed on the display device. A beginner can easily perform the teaching operation for a robot in conformity with this guide function and easily create a program for the robot.

In the second aspect, the operator can learn the teaching positions.

In the third aspect, the operator can learn the jog operation.

In the fourth aspect, the operator can learn the teaching method.

In the fifth aspect, the operator can learn the execution of the program.

In the sixth aspect, the understanding of the operator can be further facilitated.

While the invention has been described with reference to specific embodiments, it will be understood, by those skilled in the art, that various changes or modifications may be made thereto without departing from the scope of the following claims.

The invention claimed is:

1. A teaching apparatus configured to include a display device and perform a teaching operation for a robot, comprising:
   a template storage section configured to store a plurality of templates corresponding to a plurality of programs of the robot;
   a program explanatory content storage section configured to store plural pieces of explanatory content for explaining the respective plurality of programs;
   a template display section configured to display the plurality of templates stored in the template storage section on the display device;
   a template selection section configured to select one template from the plurality of templates displayed on the template display section; and
   a program explanatory content display section configured to read out explanatory content of the program corresponding to the one template selected by the template selection section from the program explanatory content storage section and configured to display the explanatory content on the display device, wherein
   the explanatory content includes an explanatory sentence and at least one of a moving image and voice corresponding to the explanatory sentence,
   the teaching apparatus further comprises:
      a teaching position explanatory content storage section configured to store explanatory content for explaining each of a plurality of teaching positions in the program, and
      a teaching position explanatory content display section configured to display the explanatory content stored in the teaching position explanatory content storage section on the display device,
   the teaching position explanatory content display section displays the explanatory content corresponding to each of the plurality of teaching positions according to a predetermined order for the plurality of teaching positions included in the program corresponding to the one template selected by the template selection section, and
   position information of each of the plurality of teaching positions taught by the teaching apparatus is stored in the program.

2. The teaching apparatus of claim 1, further comprising:
   a jog operation explanatory content storage section configured to store explanatory content for explaining a jog operation of the robot; and
   a jog operation explanatory content display section configured to display the explanatory content stored in the jog operation explanatory content storage section on the display device.

3. The teaching apparatus of claim 1, further comprising:
   a teaching method explanatory content storage section configured to store explanatory content for explaining a teaching method for teaching by causing the robot to move to the teaching position; and
   a teaching method explanatory content display section configured to display the explanatory content stored in the teaching method explanatory content storage section on the display device.

4. The teaching apparatus of claim 1, further comprising:
   a program execution explanatory content storage section configured to store explanatory content for explaining execution of a created program; and
   a program execution explanatory content display section configured to display the explanatory content stored in the program execution explanatory content storage section on the display device.

* * * * *